June 2, 1925.　　　　A. G. VOLTZ　　　　1,540,201
HACK SAW
Original Filed March 20, 1922
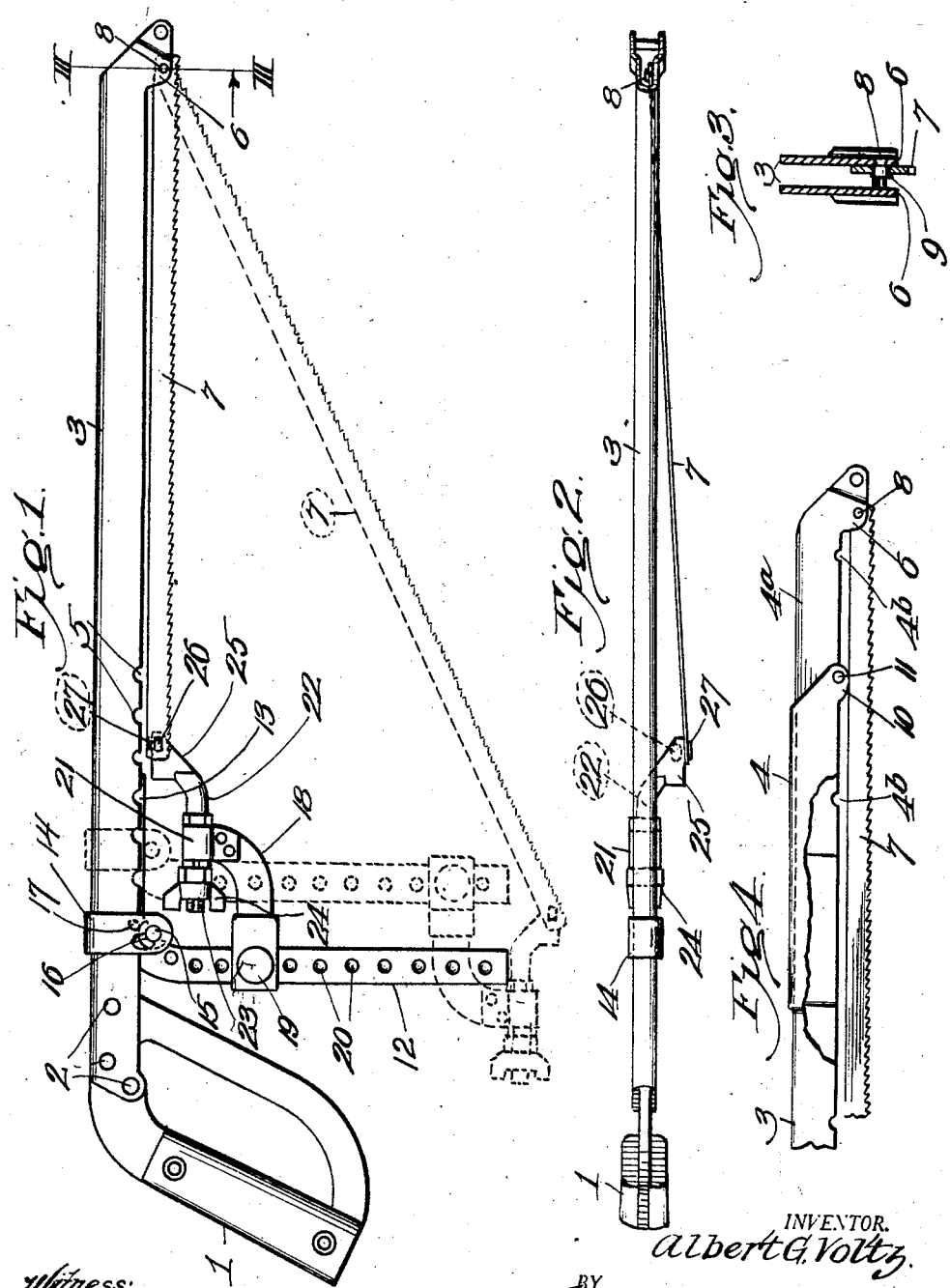
INVENTOR.
Albert G. Voltz Patented June 2, 1925.

1,540,201

UNITED STATES PATENT OFFICE.

ALBERT G. VOLTZ, OF TULSA, OKLAHOMA.

HACK SAW.

Original application filed March 20, 1922, Serial No. 545,153. Divided and this application filed March 19, 1923. Serial No. 625,964.

*To all whom it may concern:*

Be it known that I, ALBERT G. VOLTZ, a citizen of the United States, and resident of Tulsa, county of Tulsa, State of Oklahoma, have invented a certain new and useful Improvement in Hack Saws, of which the following is a complete specification.

This invention relates to hack saws and is a divisional application of that filed March 20, 1922, Serial No. 545,153, the objects being to produce a saw capable of cutting obstructions in places and at points inaccessible to ordinary hack saws and adjustable to accommodate saw blades of different length and in different angular positions.

With these objects in view, the invention consists in certain novel and useful features of construction and combinations of parts as hereinafter described and claimed; and in order that it may be fully understood, reference is to be had to the accompanying drawing, in which:—

Figure 1 is a side elevation of a hack saw embodying the invention;

Figure 2 is a plan view of the blade set to cut in a plane to one side of the plane of the back or frame;

Figure 3 is an enlarged section on the line III—III of Figure 1; and

Figure 4 is a fragmentary side view of a modified type, with the back broken away to disclose more clearly its extensible construction.

Referring to the drawing, 1 indicates the handle of the frame of the hack saw, and secured as at 2 or otherwise, at one end to the handle, is the back 3, of channeled form. In Figure 4, the back, for a suitable distance from its front end, is expanded to greater width and depth as at 4, for the accommodation of an extension 4ᵃ of the back, as hereinafter more particularly refered to.

In the lower edges of the channeled back, there are provided equi-spaced notches 5, and at the extreme front end, which is preferably tapered, the sides are extended downward to constitute ears 6, for the reception between them of the front end of a saw blade 7, one of the ears having a pin 8 projecting transversely toward but spaced from the other ear, so that the blade may be interposed between the pin and spaced ear preliminary to the attachment of the saw to or its detachment from said pin.

The blade has an eye 9 to receive the pin, and the free end of the latter is headed to prevent accidental disengagement of the blade. In the construction shown by Figure 4, the ears 6 and pin 8 are on the extension 4ᵃ of the back, this extension fitting slidingly in the back, and, under proper adjustment, accommodating blades of exceptional length. In the said modified form exemplified by Figure 4, the front end of the handle-equipped section of the back, is formed with depending lugs 10 connected by a cross-pin 11, for engagement with notches 4ᵇ in the lower edges of the extension to secure the latter at the point of adjustment desired to accommodate a particular length of blade.

For the attachment of the rear end of the blade, the following construction is provided: An arm 12 projects from the back in the plane of the channel thereof, and in the preferred construction has an arm 13 fitting snugly in the channel and secured to the back by a U-shaped clip 14 fitting thereon with its ends connected by a cross-pin 15 engaging a recess 16 formed in the angle or junction point of the two arms. To secure the clip and arms 12 and 13 at the desired point of adjustment on the channeled back, the arm 13 is equipped with a pin 17 engaging opposite notches 5, as shown by dotted lines in Figure 1, and to adjust the clip and arms, the saw blade is freed at its rear end and the arm 12 is then swung toward the handle on pin 15 as the axis. This withdraws pin 17 from the notches 5 so that the clip with the said arms can be slid forward or rearward on the back. Reversed swinging movement will dispose the pin 17 in engagement with the desired notch 5.

An angle bracket 18 is secured by a set screw 19 at the desired point on the arm 12, the latter having a longitudinal series of cavities 20 for respective engagement by the set screw to guard against slippage of the angle bracket, which may be arranged to project forward or rearward accordingly as it is desired to employ short or long saw blades. The angle bracket may also be arranged upright as in full lines or inverted as in dotted lines, it being apparent that when projecting rearward, it can be inverted only when at or near the lower extremity of the arm 12, so that the saw can extend past the arm, that is, if the saw, at its rear end, stands in the same plane as said arm and the channel. If the rear end of the saw is deflected laterally beyond the plane mentioned, as hereinafter referred to more particularly, the angle plate, in inverted position, may be set at any intermediate point in the length of the arm 12.

The opposite end of the angle plate from its point of attachment to the arm 12, constitutes a longitudinal bearing 21 for an angular holder 22 for the rear end of the blade. The rear end of the holder is threaded at 23 for engagement by a nut 24 to tension the blade.

The other end of the holder projects at an angle to the shank and terminates in a head 25, offset laterally, and having a face parallel with the shank and a side face approximately radial of the axis of the shank. A headed pin 26 projects from the radial face for engagement with the rear end of the blade when said face occupies a vertical plane as in Figure 1, so that the blade shall cut in the plane of the longitudinal center of the back. A similar pin 27 projects from the "parallel" face for engagement with the rear end of the blade when the holder is set with its angle arm projecting laterally with respect to the back, as shown by Figure 2, this adjustment holding the rear end of the blade "sprung" to the position in which it appears in said last-named figure, so that the blade may be caused to cut a pin or the like substantially flush with the surface from which such pin or the like projects.

The angular holder is susceptible of securement against accidental turning movement, but the means for cooperation with the nut 24 or the like, in accomplishing this purpose, is not detailed as it forms a part of and is claimed in the parent application hereinbefore identified.

With the construction described, it is possible when set as shown in full lines, to cut a pin or bolt within a tube of internal diameter but little greater than the distance between the top of the back and the toothed edge of the blade, provided the part to be cut is located from the entrance end of the tube a distance which can be operatively spanned by the blade. It is also possible to cut plates to an extent equal to that from the top of the back to the lowest point of the saw, when inclined, as in dotted lines, Figure 1, and this cut can be made from an interior point of the plate, provided an opening is first cut in the plate large enough to receive the tapered end of the back and the front extremity of the blade when the latter is inclined. Various other cutting actions, impracticable with the ordinary hack saw will be apparent to those skilled in the use of such appliances.

From the above description it will be obvious that I have produced a hack saw embodying the features of advantage enumerated in the statement of the objects of the invention, and which may be modified in minor particulars without departing from the spirit and scope of the appended claims.

I claim:

1. A hack saw comprising a back having a handle at one end and a transverse pin at the other end, an arm depending from the back intermediate the handle and said pin, an angle bracket mounted on said depending arm and adjustable toward and from the back, a saw blade pivoted at its front end on said pin, and a holder pivoted to the rear end of the saw blades and longitudinally adjustable relative to the back, on the angle bracket, to tension the blade and to accommodate adjustments of said angle bracket toward and from the back.

2. A hack saw comprising a back having a handle at one end and a transverse pin at the other end, an arm depending from the back intermediate the handle and said pin, an angle bracket mounted on the depending arm and adjustable toward and from the back, an angle holder rotatably and longitudinally adjustable on the angle bracket, and a saw blade pivotally connected at its ends to said pin and angle holder respectively.

3. A hack saw comprising a back having a handle at one end and a transverse pin below and in proximity to the other end, an arm depending from the back intermediate the handle and said pin, an angle bracket reversibly mounted on said depending arm and adjustable toward and from the back, a saw blade pivoted at its front end on said pin, an angle holder attached to the rear end of the saw blade and rotatable and longitudinally movable in the said angle bracket, means to lock the holder against turning movement, and means to impart longitudinal movement to it to tension the saw blade.

4. A hack saw comprising a channeled back having a handle and a transverse pin, an arm depending from the back intermediate the handle and said pin, an arm projecting from the first-named arm and fitting slidingly in the channel of the back, means for securing said arms at different points in the length of the back, an angle bracket detachably mounted on the first-named arm, an angle holder adjustably carried by the angle bracket and provided with pins standing at right angles to each other and either adapted to parallel the first-named pin under proper adjustment of the angle holder, and a saw blade detachably connected at its ends to the first-named pin and one of the pins of the angle holder.

In witness whereof I hereunto affix my signature.

ALBERT G. VOLTZ.